UNITED STATES PATENT OFFICE.

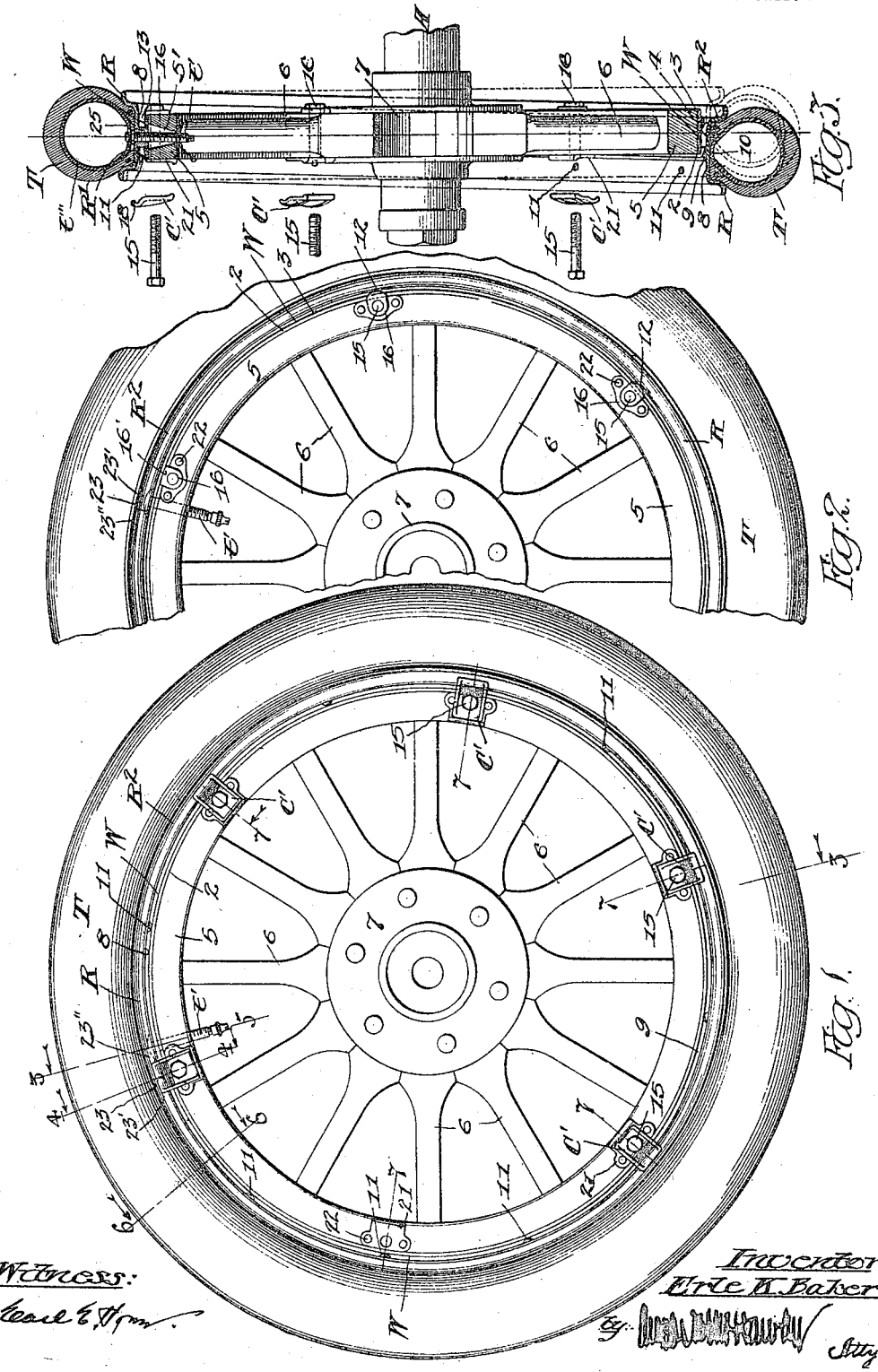

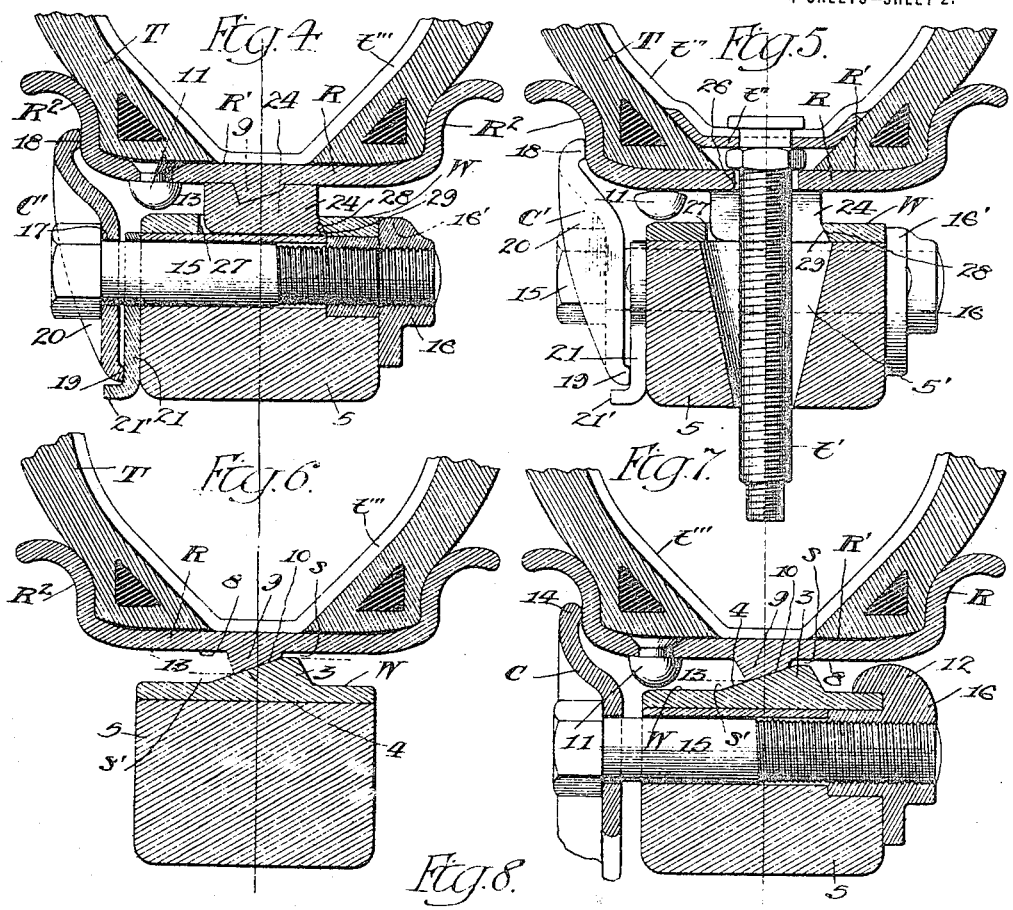
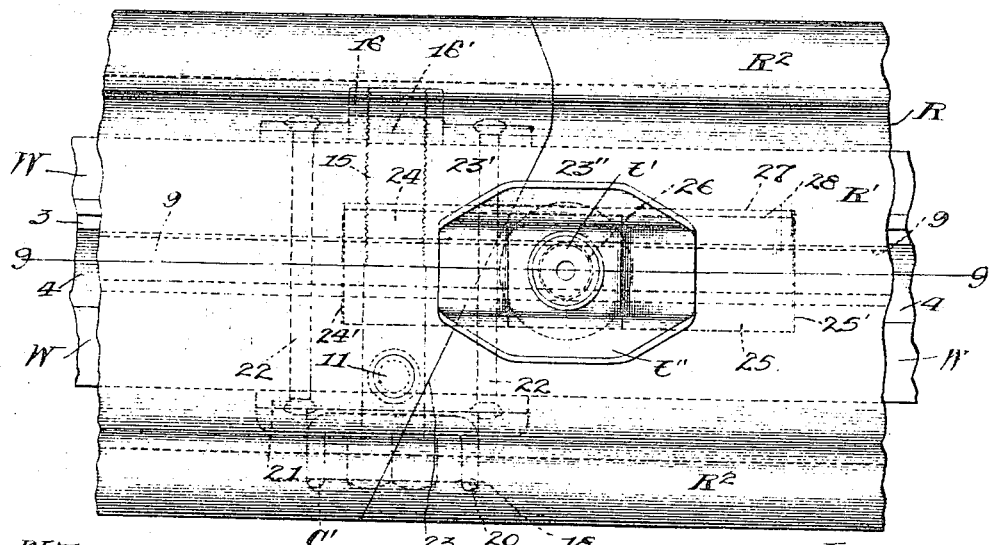

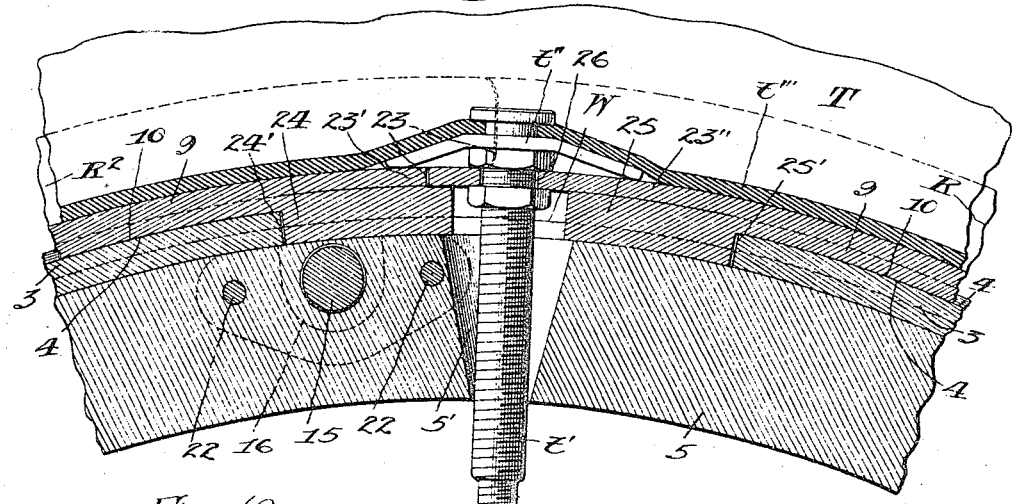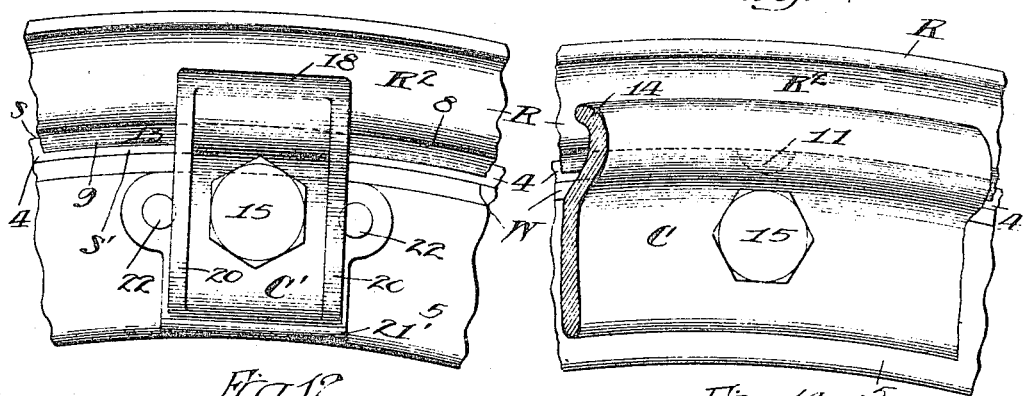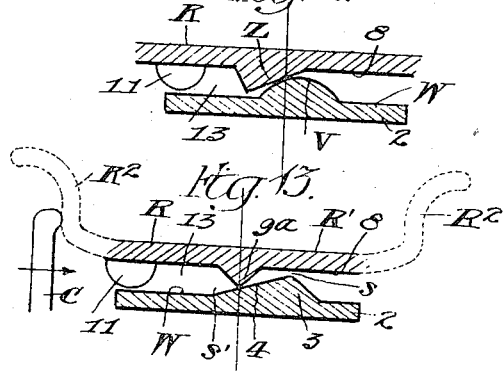

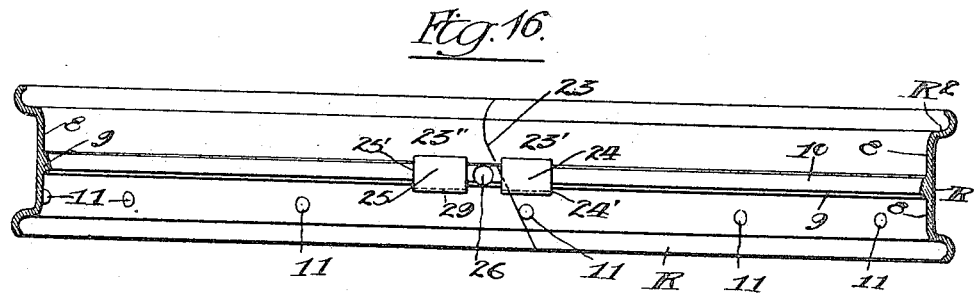
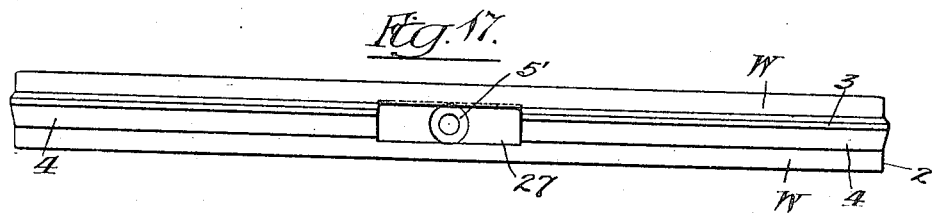
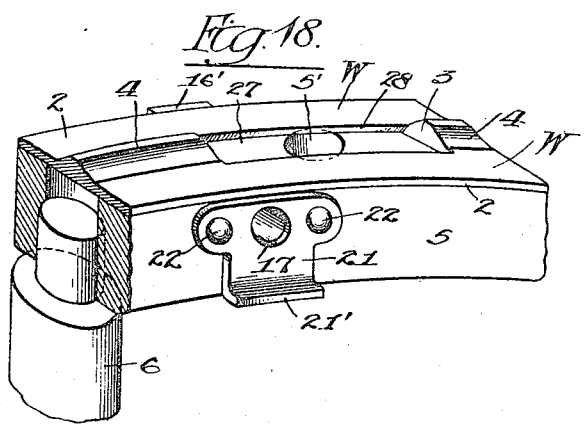
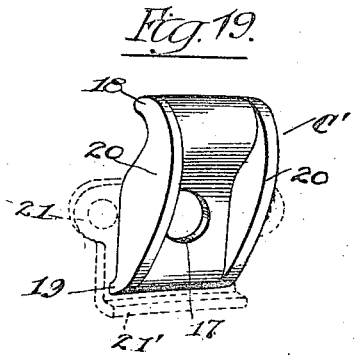

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE-RIM CONSTRUCTION.

1,183,518.  Specification of Letters Patent.  Patented May 16, 1916.

Application filed March 20, 1916. Serial No. 85,293.

*To all whom it may concern:*

Be it known that I, ERLE KING BAKER, a citizen of the the United States, residing at Chicago, Cook county, Illinois, have invented certain new and useful Improvements in Demountable-Rim Constructions, of which the following is a specification.

My invention relates to demountable rim constructions for motor vehicle wheels which are equipped with tires that require changing from time to time. It is the usual practice to put a pneumatic tire upon a demountable rim, and there inflate it before mounting the rim on the wheel of the motor vehicle. In event the tire is injured or deflated, the rim is demounted, and replaced by another bearing an inflated tire; and the detaching of the injured tire from its rim, as well as the repairing of the tire, may be postponed.

The objects of my invention will be made clear by the following statement of the problems and needs presented by the above defined practice.

The construction of a pneumatic tire is such that it does not lend itself to ready adjustment upon a rim or wheel. The rim should be so made that it will be easy to attach and detach the tire, and the rim must be capable of safely and securely holding the tire, whether in service on the wheel or being carried as an inflated "spare." The rim and wheel construction should be such that it will be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained. Unless the demounting means responds to the above requirements the structure cannot be pronounced safe or desirable, and if the circularity, concentricity and perpendicularity of the tire are not maintained, it will be found that the life of the tire is materially shortened. In addition to these requirements, it is essential that the construction shall be of the least weight consistent with the service to be performed, and it is commercially necessary that the cost of both manufacture and maintenance shall be low.

For use with standard clencher tires which have base beads that may be stretched over the flanges of the rim, the rim may be of the integrally flanged endless type, and, to that extent, simpler than those required for tires having non-stretchable base beads. But in all other respects, the problem remains the same; for the matters of demountability, security, non-distortion, circularity, concentricity and perpendicularity are of equal importance as to all tires.

The specific object of my invention is to provide a demountable rim construction which shall be applicable to rims and tires of all these types, and which shall provide a complete solution of all of the above stated problems.

The general nature and principles of my invention, and also the details of the best embodiment thereof that I have thus far devised, will be readily understood on reference to the drawings which form part of this specification; and are particularly pointed out in the appended claims.

Referring now to the said drawings:—Figure 1 is an outer side elevation of a fully equipped motor vehicle wheel embodying my invention; Fig. 2 is a partial inner side elevation thereof; Fig. 3 is a vertical longitudinal section as on the line 3—3 of Fig. 1, but showing the rim in the act of being buttoned on to the wheel, with the axial pressure plates opposite their respective positions; Fig. 4 is a cross section on the line 4—4 of Fig. 1, enlarged to full size; Fig. 5 is a similar section on the line 3—5 of Fig. 1; Fig. 6 is a section on the line 6—6 of Fig. 1; Fig. 7 is a section on any of the lines 7 of Fig. 1, and showing the axial pressure element in the form of a ring as a substitute for the several plates depicted in Fig. 1; Fig. 8 is a plan view of that portion of the demountable rim which contains the valve stem of the tire, the tire being omitted for sake of clearness; Fig. 9 is a section on the line 9—9 of Fig. 8; Fig. 10 is a full size view of a pressure-plate enlarged from Fig. 1; Fig. 11 depicts a segment of the ring shown in Fig. 7; Figs. 12, 13 and 14 illustrate primary forms of the rim-seating arrangement; Fig. 15 depicts the development of said arrangement and its a adaptation to a clencher rim; Fig. 16 is a section of a rim, showing the part which contains the transverse split; Fig. 17 is a plan view of the wheel periphery, showing the portion containing the valve stem opening and the rim and connector slot; Fig. 18 is a perspective view of a segment of the wheel felly at said slot; and Fig. 19 is a perspective view of one of the clutch pressure plates or lugs taken from Fig. 1.

The wheel shown in the drawings is an automobile wheel of the kind in most common use; but it has a preferably cylindrical periphery, W. I prefer that this shall be formed by a metal felly band, 2, hereinafter called the "fixed rim" of the wheel The cylindrical periphery thus provided is distinguished from others by a single outstanding circumferential rib, 3, one side of which rib is formed as a short or narrow frustum of a cone, 4. The small end of the frustum, 4, is presented toward the outer side of the wheel; that is, the side distant from the body of the motor vehicle. Said small end of the frustum merges with the cylindrical surface, W. It should be understood that the conical rib, 3 is fixed on the periphery of the wheel, being preferably integral with the fixed metal rim, 2. For reasons hereinafter explained, the cone frustum, 4, is positioned between the edges of the fixed rim, there remaining a plain or cylindrical portion at each side thereof.

In ordinary practice a wooden felly, 5, is compressed within the fixed rim. The wheel spokes, 6, are secured in the felly and in the hub, 7. These details are explained only for the purpose of showing that the fixed rim, 2, is circular and is concentric with the axis, A, of the wheel; and is rigid in that relation to the hub. The fixed rim, 2, need not be wider than the felly, 5, but should be enough wider than the frustum, 4, to make room on the periphery, W, for the hereinafter described guiding and centering means which preferably constitute part of my novel demountable rim construction.

Throughout the drawings the demountable rim is marked, R. The tire seat, R¹, of the demountable rim, R, may be conformed or fitted to the cross-section of any of the several types of tires now or hereafter commonly used. In most of the figures of the drawings I have shown the rim shaped to receive tires of the well-known "straight side" and "Q. D." types, while in Fig. 15, the rim is shown conformed to the cross section of a tire of the clencher type. As hereinafter explained, I so construct the rim that it is not necessary to circumferentially split the same, or to provide it with a separable flange, in order to adapt it to receive tires that cannot be stretched over its flanges. That is, I prefer that the tire-retaining flanges, R², of the rim, whatever its cross section, shall be integral with its body portion. When a stretchable clencher tire is to be used, the rim may be an endless ring with integral tire retaining flanges; but, when tires having inextensible base beads are to be accommodated, the rim is transplit (preferably in the manner hereinafter described) and thus made easy of application to such tires. Whatever the shape of its tire seat, the rim is of substantially uniform thickness from edge to edge. It is of greater width than the wheel periphery, W, and the portion of its internal periphery, 8, which is opposed to the wheel periphery, is substantially cylindrical. In these particulars my novel rim conforms to the best modern practice and lends itself to manufacture by machinery now in general use by rim makers.

The internal periphery of my rim is distinguished from other rims by the presence of a single circumferential rib, 9. This rib, 9, co-acts with the cone frustum, 4, on the wheel, the two serving to provide a single conical supporting contact between the rim and wheel, as more fully described hereinafter.

The circumference of the inner periphery of the rim is enough greater than the circumference of the wheel to provide space for these ribs, plus a slight excess which is essential to the "buttoning" or swinging on of the rim with the valve stem of the tire as a hinge-point. That is, the rim, R, carries the tire, T, and constitutes the means of applying the same to the wheel. The valve stem, t', of the tire passes through the valve stem opening, 5', in the fixed rim, 2, and felly, 5. In applying the rim to the wheel, the valve stem is placed in this opening and thereafter the rim swings thereupon, as a pivot, until the opposite side of the rim is stopped in correct position by the engagement of the conical contact ribs, 3 and 9. It will be understood that, at such time, the wheel of the motor vehicle is elevated off the ground. This is also the case when the rim and tire are being demounted from the wheel, which operation is accomplished by movements the reverse of those just described. When the rim has been fully placed on the wheel with its rib resting in proper engagement with the rib upon the wheel, as depicted by dotted lines in Fig. 3, it is then in correct position for use; and to secure it in that position, I apply a pressure device, C, (Fig. 7) or devices, C', (Fig. 1) which exert an axial thrust upon the rim to bind or clutch the seated supporting ribs, 3 and 9, firmly together. As hereinafter more fully explained, I prefer that the contacting ribs (3 and 9) shall be positioned to support the rim upon a circumferential line which includes the middle plane of the tire, T. In this manner I secure the cylindrical rim R firmly at its middle or neutral plane, and hence in a balanced condition with reference to the strains and stresses which it has to resist. The rim requires no support at its edges, and indeed is more reliably and securely held by the single line clutch described; that is, without the assistance of devices tending to distend or distort its edge portions.

To the end that my invention in its preferred form may be quickly understood, I shall here explain that a chief inventive idea embodied therein is that of clamping the rim in single-line-circumferential-conical contact with the periphery of the wheel, at the middle or neutral plane of the rim and tire. As explained hereinafter, and as used in the appended claims, the term "single-line contact" means the relatively wide or broad line of contact afforded by a single circumferential contact rib or cone frustum. By so supporting the rim at its neutral plane I provide the rim and tire with an ideally balanced support, coextensive with the circumference of the wheel, but so narrow as to avoid all danger of the rusting together of the parts to an extent which would prevent the easy demounting of the rim from the wheel. A coincident inventive idea is that of forming the rim and wheel with differing diameters and circumferences, so that the contact ribs, when unseated, allow the rim to drop into a slightly eccentric position on the wheel and to thus be freed to the extent required to permit the easy unbuttoning and rebuttoning action of the rim on the wheel. Another coincident inventive idea is that of positively correcting any distortion in the rim, also positively centering the same upon the wheel at the instant preceding the engagement of the complementary supporting ribs, and guiding them into position; all during the act of buttoning on the rim. A negatively involved idea is that of avoiding all contacts and forces which would throw the rim out of round and tend to prevent the true conical mounting of the rim on the wheel. In the past, the most common practice has been to secure the rim on the wheel by outward pressure at a number of separated points. A rim thus held is non-circular; and the effect of its non-circularity is noticed in the uneven wearing of the tread of the tire. That practice also tends to force the rim out of perpendicularity with the axis of the wheel, to the great detriment of the tire. These matters are made clear by Fig. 13 of the drawings when considered in connection with Figs. 1, 2 and 3.

Fig. 13 is a diagrammatic cross-section of the fixed and demountable rims. Therein, 2 represents the fixed rim with its cylindrical periphery, W, and a narrow circumferential cone frustum, 4. R represents the demountable rim, the flanges of which are shown in dotted lines to indicate that they may be of any desired design, and may be related to the body of the rim in any desired manner, as long as the rim, as a whole, is appropriate to the type of tire to be used. The conical contacting rib, 9ª, of the rim, R, is represented as having a sharp knife-edge which rests on the conical surface, 4, of the rib, 3 and which thus provides the hereinbefore mentioned line of conical contact between the rims, 2 and R. This line of contact may also be established by the employment of a narrow frustum of a cone, Z, on the demountable rim, coacting with a round faced rib, V, on the fixed rim, as shown in Fig. 12. Or the round rib may be on the demountable rim, and the conical rib on the fixed rim, as shown in Fig. 14.

All of the arrangements shown in Figs. 12, 13 and 14 provide true single lines of contact, but, as the fixed and removable rims are not, and cannot well be, made of tempered steel or like material which would be required to maintain actual knife-edge bearings, I find it necessary to widen or broaden this single line of conical contact. This I accomplish by peripherally truncating the narrower, or axially shorter, of the contacting ribs. Thus I arrive at the construction depicted in Fig. 15. As there shown, 4 is the narrow cone frustum on the wheel, (previously described in connection with Fig. 3); and 10 is the broadened contact line or bearing edge formed by truncating the rib, 9, of the demountable rim, R. The breadth of the single line of contact thus provided is represented by the dotted lines, $d$, $d$, in Fig. 15. Obviously the inner surface, 10, of the rib, 9, is a narrower frustum of a cone, and fits the conical rib, 4, of the wheel, and thus co-acts therewith to provide a tight and stable central or neutral plane support for the cylindrical rim.

It will be observed that the single-line conical contact shown theoretically in Figs. 12, 13 and 14, and broadened and made practical in Fig. 15, is imported into, and preserved in, the commercial forms of the invention, as best shown in Figs. 3, 6, 7, 15, and 16.

Referring again to Fig. 15, attention is directed to the two dotted lines, $r$, $r'$, which show that, when the interfitting conical ribs are in the described single-line contact, there remains a clearance space, $s$, between the rib, 3, and the inner periphery, 8, of the rim, R; and also a clearance space, $s'$, between the rib, 9, and the periphery, W, of the wheel. The allowance of this clearance between the fixed and demountable rims permits the demountable rim to assume the described initially eccentric position on the wheel, and to be buttoned or swung into place with the valve stem as a hinge, as clearly depicted in Fig. 3.

It is apparent that if the clearance (s, s') between the rims were not substantially equal all around the wheel at the moment preceding the engagement of the conical supporting surfaces, (4 and 10) it would be possible to push one side of the rim farther than the other across the rib, 3, on the wheel; and thus fail to place the rim in a plane perpendicular to the wheel axis. In practice I reduce the clearances, s, s', to the least measurement consistent with the easy mounting and demounting of the rim; but, in addition to that precaution, I provide positive means for the correction of the difficulty. Said means are hereinbefore mentioned and comprise the devices which I employ for correcting the distortion of the rim, and for centering and guiding the same on the wheel preparatory to receiving the axially directed pressure which clamps the conical ribs together.

The distortion-correcting and rim-centering devices which I prefer to use are studs or projections circumferentially spaced around the wheel. These studs may be of two kinds, or, more exactly speaking, may occupy two different positions. Both are diagrammatically shown in Fig. 14, wherein 11 represents one of a series of centering studs circumferentially spaced on the inner periphery, 8, of the rim, R, approximately opposite the outer edge of the fixed rim, 2; and 12 represents one of a circumferentially spaced series of centering studs that may be employed on the rear edge of the fixed rim, 2. These studs are of such thickness that they do not more than lightly contact the opposed surfaces; and, in actual practice, I prefer that the same shall be slightly thinner (of less height) than the annular space, 13, between the opposed peripheries of the rims. This precaution is observed in order that the centering studs shall not interfere with the proper seating of the conical supporting ribs. Theoretically, three such studs spaced around the wheel or rim should effectively center the rim on the wheel preparatory to the application of the axial pressure devices. But in the commercial manufacture of rims it is practically impossible to make them exactly circular. I therefore preferably increase the number of studs to six, and even better results are secured when as many of twelve are used. The latter arrangement is depicted in Fig. 1. The spacing of the centering studs, 12, on the inner edge of the fixed rim is shown in Fig. 2. No spacing stud, 12, is used opposite the valve stem position, as a stud or projection in that position would somewhat interfere with the buttoning on of the rim. Studs in the other positions do not interfere with that action of the rim. It will be apparent that the presence of a series of studs, 11, or of a series of studs, 12, and more particularly the joint operation thereof, results in the forcing of every arc of the rim into concentricity with the wheel by the act of buttoning the rim on the wheel. It is also obvious that after the studs, 11, engage the fixed rim, 2, they act as guides to hold the rim concentric therewith until the opposed supporting cone frustums are fully seated. The studs, 12, have a similar guiding function. Thus, by means of the described spaced studs, I insure the proper engagement of the conical surfaces of the supporting ribs; and that engagement automatically causes the middle plane of the rim and tire to coincide with the plane of the wheel, and thus insures not only the perpendicularity of the tire, but also the circularity thereof, and its concentricity, with respect to the axle of the wheel. The distortion-correcting, centering, and guiding studs serve as the initial means of bringing about this condition and obviously aid in preserving the same, but these guiding studs are not relied upon to materially support or space the removable rim on the fixed rim after the cone frustums are engaged.

Any suitable means may be employed for axially pressing the two ribs together, i. e., for clamping the rim-supporting frustums in sufficiently strong and rigid contact to prevent relative dislodgment from the correct positions above defined. Of the several devices which may be employed for the purpose, I prefer the before mentioned ring, C, or the plates or lugs, C'.

The pressure or clutch ring, C, which is best shown in Figs. 7 and 11, is preferably a continuous ring having an inwardly turned outer edge, 14, positioned to engage the outer-side flange of the rim, R. This ring is preferably secured by six bolts, 15, provided in the felly beneath the fixed rim, 2, and spaced at equal distances around the wheel, as shown in Fig. 1. Conveniently, these are headed bolts; and the nuts, 16, belonging thereto, are placed on the inner side of the wheel felly. Five of these units are incorporated with the inner side guiding studs, 12 (see Figs. 2 and 7). The sixth nut has only an abutment shoulder, 16', see Fig. 4. It may be here explained that these nuts exert their thrust against the edge of the rim, 2, in opposition to the thrust of the rim, R, thereon. When the rim has been seated, as indicated in Fig. 7, the ring, C, is placed in position and is driven home against the rim by means of the several bolts, 15. By this means the conical supporting rib, 9, of the rim, R, is firmly and rigidly bound upon the conical rib, 3, of the fixed rim.

The pressure plates, C', which may be employed in lieu of the ring, C, are similarly positioned with respect to the wheel and the rim felly. They may be regarded as sections of a ring like unto the ring, C, but are in some cases preferred, inasmuch as they may be separately applied and tightened, or removed, and are of less weight. In most cases I prefer that there shall be six of the plates, C', one on each of the six bolts, 15. A description of one pressure plate, C', will serve for all. As shown in Figs. 1, 3, 4, 5, 8, 10 and 19, the face of the plate is substantially rectangular. It contains a hole, 17, for the bolt, 15. Its upper edge, 18, is strengthened, and best formed for engagement with the rim, by being bent inwardly. From that point the body of the plate is bent inwardly to avoid further contact with the rim, but approaches the side of the underlying felly of the wheel, as shown in Fig. 4. The lower edge, 19, is preferably bent inwardly to provide a raised bearing, for action against the wheel felly. Reinforcing flanges, 20, are provided on the upright or radial edges of the plate. The plate is preferably a metal stamping and is extremely strong, as required to sustain the pressure of the bolt.

For each plate, C', I provide a protecting plate or washer, 21, on the side of the wheel felly. This plate may be held by the same felly rivets, 22, which secure the nuts, 16, (see Figs. 1, 2, 8, 9, 10 and 18). An outwardly turned flange, 21', at the radially inward end of the plate, 21, serves to prevent the twisting of the plate, C', when the bolt is being tightened, see Figs. 1, 2, 4, 5, 10, 18 and 19.

From the foregoing description it will be understood that every type of rim, R, may be an endless ring; provided the tire to be used therewith admits of the employment of an endless rim. But, at the present time, the greater demand is that the demountable rim shall be rendered safe by being provided with integral tire retaining flanges, and shall at the same time be applicable to tires that cannot be stretched on over endless integral rim flanges. I therefore make the rim of one or the other of the typical cross-sections disclosed in the drawings, and transversely split the rim at one point in its circumference. The transverse split, or cut, takes on a novel form which causes the abutting rim ends to be self-holding and alining under the compressive action of an inflated tire. And to prevent the opening or expansion of the rim when on the wheel, I provide adequate means for detachably, but positively and non-adjustably, connecting the rim ends when in that position.

The novel form of transverse split or cut in the rim, R, appears in Figs. 1, 2, 8, 9, and 16, and is fully shown in Figs. 8 and 16. It is of the kind which extends from a point on one edge of the rim to a circumferentially advanced point on the other edge thereof, whereby the rim ends are made readily separable in transverse directions, as required to permit the rim to be helically applied to, and withdrawn from, the base beads of the tire. It differs from the forms shown in Patents No. 1,095,778 and No. 1,095,996 to the extent that the cut is not straight from point to point, but is reversely directed for a short distance adjacent one edge, so that one end of the rim is pointed and rests in the gap of the other. The form of the split, and of the resulting rim-ends, here described, is disclosed by the relatively diagonal line, 23, in Figs. 8 and 16. Only the ends of the split appear in Figs. 1 and 2. Thus formed, the rim ends, 23', and 23'', become self-alining against the collapsing pressure of the tire thereon, and it is not necessary to provide other means for holding the ends in alinement while the rim is being carried with an inflated spare tire. I shall not claim this novel form of transverse split in this application for it is both described and claimed in a companion application executed of even date herewith, to-wit, Serial No. 86,598. It is, however, specially adaptable to the subject-matter of this present application, for in the case of a rim and wheel having the neutrally or centrally positioned supporting ribs, a separate rim end connecting plate can readily be dispensed with; and to do so, it is essential that the rim ends shall be made self-holding and self-alining.

In the present structure, the actual or positive connection of the otherwise separable rim ends, 23', 23'', is accomplished by fixed studs, lugs, or projections, 24 and 25, which I form on the inner periphery, 8, of the rim, adjacent the transplit therein. These studs may be applied to the rolled rim, R, in any desired manner, as by riveting or spot-welding them, and are rigid thereon. I prefer that the valve stem hole, 26, in the rim shall be closely adjacent to the split, so that the spreader, t'', of the valve stem, t', may cover the part of the split which would otherwise be exposed, and endanger the inner tube, t''', of the tire, T. To accommodate the valve stem in this position I prefer to separate the studs or lugs (24 and 25) rather than to place them in abutment and form a valve stem hole in one thereof, as shown in Patent No. 1,095,771. The preferred construction is shown in Figs. 8, 9, and 16. To accommodate both the valve stem and the studs, 24, 25, the fixed rim is punched or perforated as shown in Figs. 4, 5, 8, 9, 16, 17 and 18. The studs have preferably square ends, 24', and 25', and the perforation or slot, 27, in the fixed rim, 2, is shaped to fit and receive them when the rim is placed on the wheel, as shown in Figs. 3, 4, 5 and 8 and 9. In that position the fixed rim, 2, and the studs, 24, 25, constitute a strong and dependable rim-end connector, or connection, which prevents the separation of the rim ends and hence causes the rim to act as though it were endless. The lugs, 24, 25, obviously, and as shown in Figs. 3, 4, and 5, freely rock into interlocking position in the slot, 27, when the rim, R, is buttoned on the wheel. To overcome any possible tendency of the action of the interfitting conical ribs to expand the rim ends and distort them outwardly, I provide the slot, 27, with an overhanging ledge, 28, and form the lugs with complementary lateral ledges or projections, 29, to interlock therewith. These ledges interlock as the rim is being buttoned into place and thereafter positively lock the ends of the rim, R, against radial distention or separation from the body of the wheel.

In my construction, as will be evident, the clutching together of the conical surfaces or seats of the rim supporting ribs in the neutral plane of the rim, insures the rotation of the rim together with the wheel, and thus prevents the "creeping" of the rim. In addition, the ends of the lugs, 24, 25, engage the fixed rim at the ends of the slot, 27, as before explained; and hence provides a driving connection adequate to any emergency.

As shown in Fig. 9, the ends of the rim are slightly separated; so that, to represent the split, 23, two lines must be used instead of a single line, as in Fig. 16. This separation of the rim ends (23', 23''), although only a small fraction of an inch, leaves them free to close together when on the fixed rim. In consequence, the pressure of the inflated tire upon the rim, is made effective to clasp the supporting rib, 9, of the rim tightly upon the opposed cone frustum, 4, of the fixed rim. Because of this action, I commonly refer to the rim mounting construction as a pneumatic conical clutch.

To those who are skilled in the art, it will be apparent that by means of the structure herein disclosed, I accomplish the fulfilment of all the objects and requirements set forth in the opening paragraphs of this specification.

While I have illustrated and described my invention in accordance with the patent statutes, I desire it to be understood that the details of construction may be materially varied, and that many changes, modifications and substitutions may be made in the demountable rim construction herein illustrated without departing from the spirit and scope of my invention as set forth in the appended claims.

I claim:—

1. The improvement herein described, comprising a wheel, in combination with a tire-carrying rim demountably held thereon in only single-line circumferential contact therewith, and said contact being effected between respectively integral parts of the rim and wheel.

2. The improvement herein described, comprising a wheel, in combination with a tire-carrying rim demountably held thereon in only single-line conical contact therewith, and said contact being effected between respectively integral parts of the rim and wheel.

3. The improvement herein described, comprising a wheel, in combination with a tire-carrying rim demountably held thereon in balanced single-line circumferential contact therewith in the neutral plane of the rim.

4. The improvement herein described, comprising a wheel, in combination with a tire-carrying rim demountably held thereon in balanced single-line conical contact therewith in the neutral plane of the rim.

5. The improvement herein described, comprising a wheel, in combination with a tire-carrying rim demountably clutched thereon in single-line conical contact therewith in the neutral plane of the rim and wheel.

6. The improvement herein described, comprising a wheel, in combination with a transplit tire-carrying rim demountably clutched thereon in balanced single-line conical contact therewith in the neutral plane of the rim and wheel.

7. The improvement herein described, comprising a wheel, in combination with a transplit tire-carrying demountable rim pneumatically clutched thereon in balanced single-line circumferential contact therewith in the neutral plane of the rim and wheel.

8. The improvement herein described, comprising a wheel having a conical periphery, in combination with a tire-carrying rim demountably held in single-line circumferential supporting contact with said conical periphery of the wheel.

9. The improvement herein described, comprising a wheel having a conical periphery, in combination with a tire-carrying rim demountably clutched in balanced single-line circumferential contact with said conical periphery of the wheel at the neutral plane of the rim.

10. The improvement herein described, comprising a wheel having a circumferential narrow frustum of a cone on its periphery, in combination with a tire-carrying rim having a complementary circumferential rib on its inner periphery, positioned for single-line circumferential clutching engagement with said frustum at the neutral plane of the rim.

11. The herein described improvement, comprising a wheel having a circumferential frustum of a cone on its periphery, in combination with an integrally flanged transplit tire-carrying rim having a complementary circumferential rib on its inner periphery, and pneumatically clutched in balanced single-line circumferential contact with said frustum, substantially in the neutral plane of the rim and wheel.

12. The improvements herein described, comprising, in combination, a wheel and a complementary tire-carrying rim clamped thereon in balanced single-line circumferential contact therewith at the neutral plane of the rim and wheel.

13. The improvements herein described, comprising a wheel in combination with a tire-carrying rim demountably held thereon and engaged in balanced single-line circumferential contact by complementary cone frustums thereon in the neutral plane of the rim and wheel.

14. The improvements herein described, comprising a wheel, in combination with a tire-carrying rim demountably held thereon in single-line conical contact therewith in the neutral plane of the rim and the parts being proportioned to provide clearances that permit the "buttoning" and "unbuttoning" of the rim on the wheel.

15. The improvements herein described, comprising a wheel having a single circumferential conical rib on its periphery, in combination with a suitably-flanged tire-carrying rim having a complementary circumferential conical rib on its inner periphery, and midway between its flanges; and said ribs being proportioned to provide clearances which permit the rim to be "buttoned on" to the wheel.

16. The improvement herein described, comprising a wheel, in combination with a transplit tire-carrying rim demountably clutched thereon in single-line conical contact therewith, clearance being provided between the wheel and rim to permit the "buttoning on" of the latter, and means being provided to center and guide the rim on the wheel at the moment of buttoning on.

17. The improvement herein described, comprising a wheel, in combination with a tire-carrying rim demountably engaged therewith in balanced single-line circumferential contact therewith at the neutral plane of the rim, clearance being provided between the wheel and rim to permit the "buttoning on" of the latter, and means being provided to correct distortion of the rim and center and guide it to perpendicular position on the wheel at the moment of buttoning on.

18. The improvement herein described, comprising a wheel, in combination with a tire-carrying rim demountably clutched and balanced thereon in single-line conical contact therewith at the neutral plane of the rim, clearance being provided between the wheel and rim to permit the "buttoning on" of the latter, and means being provided to center and guide the rim on the wheel at the moment of buttoning on.

19. The improvement herein described, comprising a wheel, in combination with a tire-carrying rim demountably clutched and balanced thereon in single-line conical contact therewith at the neutral plane of the rim, clearance being provided between the wheel and rim to permit the "buttoning on" of the latter, and spaced studs on the inner periphery of the rim and adapted to center and guide the rim on the wheel at the moment of buttoning on.

20. The improvements described, comprising a wheel, in combination with a tire-carrying rim demountably clutched and balanced thereon in single-line conical contact therewith at the neutral plane of the rim, clearance being provided between the wheel and rim to permit the "buttoning on" of the latter, and spaced studs on the periphery of the wheel and adapted to center the rim on the wheel at the moment of buttoning on.

21. The improvement herein described, comprising a wheel, in combination with a tire-carrying rim demountably clutched and balanced thereon in single-line conical contact therewith at the neutral plane of the rim, clearance being provided between the wheel and rim to permit the "buttoning on" of the latter, and circumferentially spaced studs on both the rim and the wheel and adapted to center and guide the rim to clutching position on the wheel at the moment of buttoning on.

22. The improvement herein described, comprising a wheel, in combination with a tire-carrying rim demountably clutched and balanced thereon in single-line conical contact therewith at the neutral plane of the rim, and axial pressure means on the wheel for holding the rim in clutched position thereon, clearance being provided between the wheel and rim to permit the "buttoning on" of the latter, and means being provided to center and guide the rim on the wheel at the moment of buttoning on.

23. The improvement herein described, comprising a wheel, in combination with a tire-carrying rim demountably clutched and balanced thereon in single-line conical contact therewith at the neutral plane of the rim, axial pressure plates on the wheel, the same pressing against the outer side of the rim and holding the rim in clutched position on said wheel, and clearance being provided between the wheel and rim to permit the "buttoning on" of the latter.

24. The improvement herein described, comprising a wheel, in combination with a tire-carrying rim demountably clutched and balanced thereon in single circumferential contact therewith at the neutral plane of the rim, and axial pressure bolts on the wheel and means thereon for holding the rim in clutched position on said wheel.

25. The improvement herein described, comprising a wheel, in combination with a tire-carrying rim demountably clutched thereon in single-line contact with the periphery thereof, and axial pressure means on the outer side of the wheel for holding the rim in clutched position thereon.

26. The improvement herein described, comprising a wheel, in combination with a tire-carrying rim demountably clutched and balanced thereon in single circumferential conical contact therewith at the neutral plane of the rim, and axial pressure plates and operating bolts circumferentially spaced on the wheel for holding the rim in clutched position thereon and clearance being provided between the wheel and rim to permit the "buttoning on" of the latter.

27. The improvement herein described, comprising a wheel, in combination with a transplit demountable tire-carrying rim therefor, said rim being clutched upon the wheel along a single circumferential line, and rim-end lugs circumferentially engaged with the wheel and also laterally interlocked therewith in manner to prevent radial displacement of the rim-ends with respect to the wheel.

28. The improvement herein described, comprising a wheel having a fixed rim, in combination with a transplit demountable tire-carrying rim therefor, means for holding the rim in single-line conical contact with said fixed rim, and rim-end lugs circumferentially engaged with the fixed rim and having ends which are laterally interlocked therewith in manner to prevent the radial displacement of the rim-ends on said fixed rim.

29. The herein described improved axial pressure plate for securing a demountable rim on a wheel, comprising a metal stamping characterized by outstanding radial edge reinforcing flanges, a relatively depressed and inwardly curved body portion and an inwardly turned rim-flange-engaging outer end.

30. The herein described suitably flanged tire-carrying demountable rim characterized by a single circumferential supporting rib on its inner periphery, and midway between its flanges.

31. The herein described improved tire-carrying demountable rim characterized by a single circumferential supporting rib on its inner periphery, and midway between its edges, and the inner peripheral face of said rib being a frustum of a cone.

32. The herein described suitably flanged tire-carrying demountable rim characterized by a series of circumferentially spaced centering studs adjacent its outer flange and having a circumferential supporting rib on its said inner periphery midway between its flanges and the inner peripheral face of said rib being a frustum of a cone.

33. The herein described improved tire-carrying demountable transplit rim in combination with rim-end connecting means on said rim, said rim having a series of circumferentially spaced centering studs on its inner periphery and also having a circumferential supporting rib on its said inner periphery, the inner face of said rib being a cone frustum.

34. The herein described tire-carrying demountable transplit rim characterized by a circumferential supporting rib on its said inner periphery, the inner face of said rib being a frustum of a cone, and driving lugs projecting inwardly from said rib and provided with wheel interlocking ledges, as and for the purposes specified.

35. A wheel having a single circumferential and conical rim seat formed on its periphery, in combination with a tire-carrying rim having a single complementary conical seat by which it is circumferentially fitted to said rim seat and is held out of contact with the remainder of the wheel periphery, clamping means adjustable on the outer side of said wheel and pressing only axially against said rim to clutch said seats together, and said rim being transversely cut across and having its rim-ends loosely connected whereby it is adapted to be further clutched upon said rim seat by the pressure of the inflated pneumatic tire which it carries.

36. A wheel having a single circumferential and conical rim seat formed on its periphery, in combination with a tire-carrying rim having a single complementary conical seat by which it is circumferentially fitted to said rim seat and is held out of contact with the remainder of the wheel periphery, and clamping means adjustable on the outer side of said wheel and pressing only axially against said rim to clutch said seats together.

In testimony whereof, I have hereunto set my hand this 18th day of March, 1916.

ERLE KING BAKER.